(12) United States Patent
Shen

(10) Patent No.: US 11,997,657 B2
(45) Date of Patent: *May 28, 2024

(54) RESOURCE CONFIGURATION METHOD AND APPARATUS, AND COMPUTER STORAGE MEDIUM

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/816,929

(22) Filed: Aug. 2, 2022

(65) Prior Publication Data

US 2022/0369310 A1 Nov. 17, 2022

Related U.S. Application Data

(63) Continuation of application No. 16/924,621, filed on Jul. 9, 2020, now Pat. No. 11,457,441, which is a (Continued)

(51) Int. Cl.
*H04W 72/04* (2023.01)
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
CPC ........... H04W 72/0446; H04W 72/042; H04W 74/08; H04W 16/14; H04W 24/08;
(Continued)

(56) References Cited

U.S. PATENT DOCUMENTS 9,572,063 B2 * 2/2017 Etemad ................. H04W 24/04
2007/0177494 A1 8/2007 Tomizawa
(Continued)

FOREIGN PATENT DOCUMENTS

CN 101022644 A 8/2007
CN 101494867 A 7/2009
(Continued)

OTHER PUBLICATIONS

Decision of Refusal of the Chinese application No. 202011288062.9, dated Sep. 8, 2022. 9 pages with English translation.
(Continued)

*Primary Examiner* — Wei Zhao
(74) *Attorney, Agent, or Firm* — PERKINS COIE LLP

(57) ABSTRACT

A method for resource configuration, a terminal and a non-transitory computer storage medium are provided. The method includes: a terminal receiving first control information from a network device, the first control information including slot structure information of N slots and N being a positive integer; and the terminal determining slot structures of the N slots according to the first control information.

10 Claims, 5 Drawing Sheets

A terminal receives first control information from a network device, wherein the first control information includes slot structure information of N slots, and N is a positive integer — 101

The terminal determines slot structures of the N slots according to the first control information — 102

Related U.S. Application Data continuation of application No. PCT/CN2018/072483, filed on Jan. 12, 2018.

(58) Field of Classification Search
CPC ... H04L 5/0053; H04L 5/0048; H04L 5/0094; H04L 5/0007; H04L 27/2607
See application file for complete search history.

(56) References Cited

U.S. PATENT DOCUMENTS

| | | | |
|---|---|---|---|
| 2014/0226575 | A1 | 8/2014 | Davydov |
| 2018/0206226 | A1* | 7/2018 | Zeng ............... H04L 5/0053 |
| 2020/0092866 | A1* | 3/2020 | Xue ............... H04L 5/0053 |
| 2020/0092880 | A1 | 3/2020 | Choi et al. |
| 2020/0128538 | A1 | 4/2020 | Wang et al. |
| 2020/0128571 | A1 | 4/2020 | Tang |
| 2020/0170028 | A1 | 5/2020 | Tang |
| 2021/0120570 | A1 | 4/2021 | Tang |

FOREIGN PATENT DOCUMENTS

| | | |
|---|---|---|
| CN | 104184540 A | 12/2014 |
| CN | 106507493 A | 3/2017 |
| CN | 106793127 A | 5/2017 |
| CN | 107318166 A | 11/2017 |
| CN | 110582952 A | 12/2019 |
| EP | 3618541 A1 | 3/2020 |
| EP | 3644674 A1 | 4/2020 |
| JP | 2020-511897 A | 4/2020 |
| KR | 10-2018-0108342 A | 10/2018 |
| WO | 2018174692 A1 | 9/2018 |

OTHER PUBLICATIONS

Qualcomm Incorporated, R1-1721702, "Offline discussion on GC-PDCCH carrying SFI", 3GPP TSG RAN WG1 #91, 3GPP (Dec. 4, 2017). 17 pages.
First Office Action of the Korean application No. 10-2020-7021256, dated Oct. 27, 2022. 8 pages with English translation.
Notice of Allowance of the Korean application No. 10-2020-7021256, dated Apr. 21, 2023. 3 pages with English translation.
3GPP TSG RAN WG1 Meeting 91 R1-1720637, Reno, USA, Nov. 27-Dec. 1, 2017, Agenda Item: 7.3.1.3, Source: InterDigital Inc. Title: On configuration of GC-PDCCH for dynamic SFI, Document for: Discussion and Decision. 4 pages.
3GPP TSG-RAN WG1 RAN1#90bis R1-1718603, Prague, CZ, Oct. 9-13, 2017, Agenda item: 7.3.1.3, Source: Nokia, Nokia Shanghai Bell , Title: On the remaining aspects of group-common PDCCH in NR, Document for: Discussion and Decision. 4 pages.
3GPP TSG RAN WG1 NR Ad-Hoc#2 R1-1711184, Jun. 27-30, 2017, Qingdao, P.R. China, Agenda item: 5.1.3.1.4.2, Source: Qualcomm Incorporated, Title: Contents of group common PDCCH, Document for: Discussion/Decision. 6 pages.
Notice of intention to reject of the Singaporean application No. 11202006621X, dated Jun. 22, 2023. 2 pages.
International Search Report in the international application No. PCT/CN2018/072483, dated Oct. 8, 2018.
Center for Advanced Transportation Technology. "Remaining Design Aspects of Slot Format Indication (R1-1717824)" 3GPP TSG RAN WG1 Meeting #90bis, Prague, Czechia, Oct. 9-13, 2017, Oct. 13, 2017 (Oct. 13, 2017), p. 2, lines 3-16.

Oppo, "Remaining issues on GC-PDCCH", 3GPP TSG RAN WG1 Meeting #90bis R1-1719984, issued on Dec. 1, 2017, section 3, 7.
First Office Action of the Chinese application No. 201880002970.1, dated Jan. 20, 2020.
Second Office Action of the Chinese application No. 201880002970.1, dated May 25, 2020.
LG Electronics; "Discussion on group common PDCCH", 3GPP TSG RAN WG1 #90bis, R1-1719919, Reno, US Nov. 27-Dec. 1, 2017.
Panasonic; "Remaining details on group-common PDCCH", 3GPP TSG RAN WG1 Meeting 91, R1-1720495, Reno, USA, Nov. 27-Dec. 1, 2017.
NTT Docomo, Inc .; "Remaining details on group-common PDCCH", 3GPP TSG RAN WG1 Meeting 91, R1-1720813, Reno, USA, Nov. 27-Dec. 1, 2017.
Written Opinion of the International Search Authority in the international application No. PCT/CN2018/072483, dated Oct. 8, 2018.
Supplementary European Search Report in the European application No. 18899792.8, dated Dec. 14, 2020.
3GPP TSG RAN WG1 NR Meeting 90bis, R1-1717485, vivo, "Design of group-common PDCCH", mailed on Oct. 8, 2017.
3GPP TSG RAN WG1 Meeting #90, R1-1712445, ZTE, "Contents for Group-common PDCCH", mailed on Aug. 20, 2017.
3GPP TSG RAN WG1 #90bis, R1-1717643, Samsung, "On UE-Group Common PDCCH", mailed on Oct. 8, 2017.
3GPP TSG RAN WG1 Meeting #90bis, R1-1717512, ZTE, Sanechips, "Remaining details on group-common PDCCH", mailed on Oct. 8, 2017.
Office Action of the Indian application No. 202027033523, dated Sep. 6, 2021. 6 pages with English translation.
First Office Action of the European application No. 18899792.8, dated Oct. 13, 2021. 6 pages.
Catr, Discussion on the remaining details of SFI design[online], 3GPP TSG RAN WG1#91 R1-1720751, Internet<URL:http://www.3gpp.org/ftp/tsg_ran/WG1_RL1/TSGR1_91/Docs/R1-1720751.zip>, Nov. 17, 2017. 7 pages.
First Office Action of the Japanese application No. 2020-538057, dated Dec. 3, 2021. 10 pages with English translation.
Subsequent Examination Report of the Indian application No. 202027033523, dated Mar. 10, 2022. 3 pages.
First Office Action of the Chinese application No. 202011288062.9, dated Mar. 28, 2022. 14 [ages with English translation.
Second Office Action of the Japanese application No. 2020-538057, dated Mar. 29, 2022. 6 pages with English translation.
Hearing notice of the Indian application No. 202027033523, dated Apr. 6, 2022. 2 pages with English translation.
Qualcomm Incorporated, "Offline discussion on GC-PDCCH carrying SFI",3GPP TSG RAN WG1 #90bis, Prague, Czech Republic. R1-1719172, Oct. 13, 2017. 14 pages.
First Written Opinion of the Singaporean application No. 11202006621X, dated Apr. 11, 2022. 10 pages.
European Search Report in the European application No. 22168043.2, dated Jun. 17, 2022. 16 pages.
Second Office Action of the Chinese application No. 202011288062.9, dated Jun. 9, 2022. 10 pages with English translation.
First Office Action of the U.S. Appl. No. 16/924,621, dated Mar. 7, 2022.
Notice of Allowance of the U.S. Appl. No. 16/924,621, dated Jun. 29, 2022.
First Office Action of the Vietnamese application No. 1-2020-04367, dated Oct. 30, 2023. 4 pages with English translation.
First Office Action of the Mexican application No. MX/a/2020/007459, dated Sep. 22, 2023. 6 pages with English translation.

* cited by examiner

```
┌─────────────────────────────────────────────────────────────────┐
│ A terminal receives first control information from a network   │    101
│ device, wherein the first control information includes slot    │───/
│ structure information of N slots, and N is a positive integer  │
└─────────────────────────────────────────────────────────────────┘
                                  │
                                  ▼
┌─────────────────────────────────────────────────────────────────┐    102
│ The terminal determines slot structures of the N slots          │───/
│ according to the first control information                      │
└─────────────────────────────────────────────────────────────────┘
```

FIG. 1

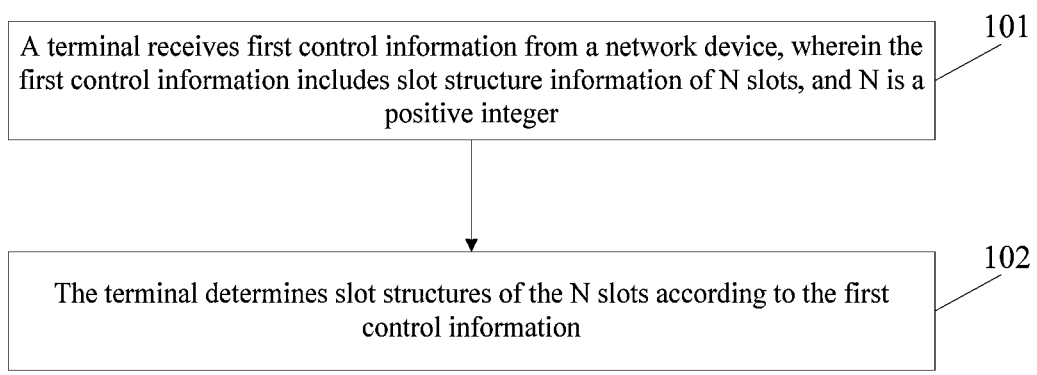

First control information

FIG. 2

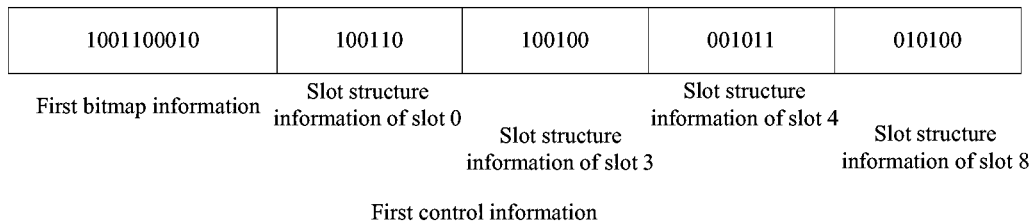
FIG. 3
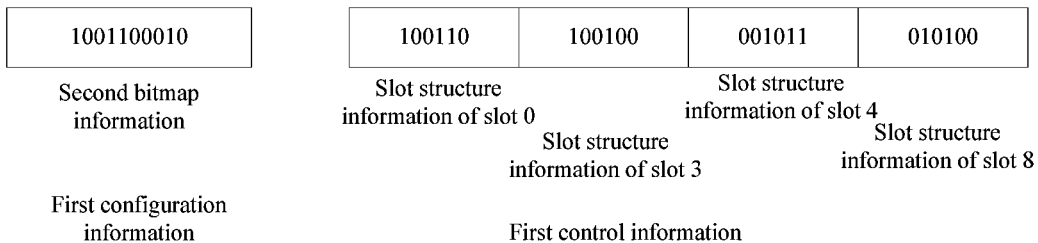
FIG. 4
| A network device sends first control information to a terminal to enable the terminal to determine slot structures of N slots according to the first control information, wherein the first control information includes slot structure information of the N slots, and N is a positive integer | 501 |
FIG. 5

RESOURCE CONFIGURATION METHOD AND APPARATUS, AND COMPUTER STORAGE MEDIUM

CROSS REFERENCES

This is a continuation application of U.S. patent application Ser. No. 16/924,621, filed on Jul. 9, 2020, which is a continuation application of International Patent Application No. PCT/CN2018/072483, filed on Jan. 12, 2018, the contents of which are incorporated by reference herein in their entireties for all purposes.

TECHNICAL FIELD

The disclosure relates to the technical field of wireless communications, and particularly to a method for resource configuration, a terminal and a non-transitory computer storage medium.

BACKGROUND

In a New Radio (NR) system, a slot or symbol is taken as a scheduling unit. Each slot includes 14 Orthogonal Frequency Division Multiplexing (OFDM) symbols. A frame structure of an NR system is flexibly changeable, and there may be a Down Link (DL) symbol, an Up Link (UL) symbol and a flexible symbol in a slot. Here, the flexible symbol is also called an unknown symbol. A flexible symbol may be used for DL transmission or UL transmission by means of signaling rewriting, or a transmission direction of the flexible symbol may be kept unchanged.

A specific slot format is configured by means of Slot Format Indication (SFI) information. A base station sends an SFI in a Group Common Physical Downlink Control Channel (GC-PDCCH). A network configures a search space for the GC-PDCCH. The GC-PDCCH is transmitted in the search space configured by the network.

A dynamic SFI may indicate slot formats of all slots in a monitoring cycle. In the NR system, a monitoring cycle indicated by a dynamic SFI includes at most 20 slots. One SFI needs to indicate slot formats of all the slots in the monitoring cycle. If the slot format of each slot needs to be indicated by K bits, the total number of bits in the SFI is 20×K. For example, if K=6, the SFI should contain 120 bits. As a result, the number of bits in the SFI information is too large, affecting channel detection performance of a GC-PDCCH.

SUMMARY

A method for resource configuration, a terminal and a non-transitory computer storage medium are provided in embodiments of the disclosure.

A method for resource configuration provided in embodiments of the disclosure includes: receiving, by a terminal, first control information from a network device, wherein the first control information includes slot structure information of N slots, and N is a positive integer; and determining, by the terminal, slot structures of the N slots according to the first control information.

A terminal provided in embodiments of the disclosure include: a transmission device, configured to receive first control information from a network device, wherein the first control information includes slot structure information of N slots, and N is a positive integer; and a processor, configured to determine slot structures of the N slots according to the first control information.

In embodiments of the disclosure, a non-transitory computer storage medium stored with computer-executable instructions which, when executed by a processor, implement the actions of: receiving first control information from a network device, wherein the first control information includes slot structure information of N slots, and N is a positive integer; and determining slot structures of the N slots according to the first control information.

BRIEF DESCRIPTION OF THE DRAWINGS

The drawings described herein are intended to provide a further understanding of the disclosure and constitute part of the disclosure. Exemplary embodiments of the disclosure and descriptions thereof serve to explain the disclosure and not intended to form improper limits to the disclosure. In the drawings:

FIG. 1 illustrates a first flowchart of a method for resource configuration according to some embodiments of the disclosure.

FIG. 2 illustrates a first schematic diagram of first control information according to some embodiments of the disclosure.

FIG. 3 illustrates a second schematic diagram of the first control information according to some embodiments of the disclosure.

FIG. 4 illustrates a schematic diagram of first configuration information and the first control information according to some embodiments of the disclosure.

FIG. 5 illustrates a second flowchart of a method for resource configuration according to some embodiments of the disclosure.

DETAILED DESCRIPTION

Figure 6:
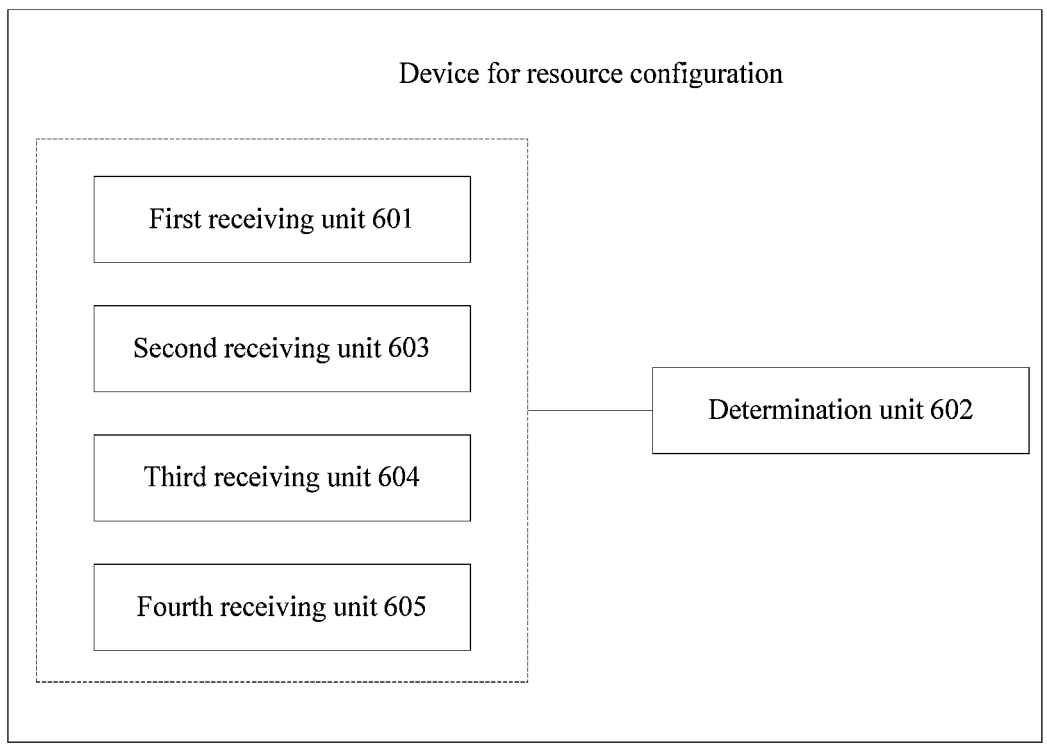
FIG. 6 illustrates a first schematic diagram of structural composition a device for resource configuration according to some embodiments of the disclosure.

To facilitate understanding of the technical solutions of the embodiments of the disclosure, related configurations involved in the embodiments of the disclosure will be described below.

Slot format configurations in a system mainly include the following:

1: Semi-persistent slot format configuration. The semi-persistent slot format configuration further includes the following two modes:

1.1) Cell-specific semi-persistent slot format configuration; and 1.2) User Equipment (UE)-specific semi-persistent slot format configuration.

2: Dynamic Slot Format Indication.

In an implementation, a network configures UL and DL slot structures in a semi-persistent slot format. The semi-persistent slot format configuration may indicate the numbers, positions, etc. of DL symbols, UL symbols and flexible symbols in a slot. In another implementation, the network may send an SFI via dynamic signaling (for example, a GC-PDCCH) to dynamically indicate a slot structure. Here, the SFI may indicate a DL symbol, a UL symbol and a flexible symbol. In addition, the SFI may dynamically indicate the slot structure in combination with the semi-persistent slot format configuration. In a slot structure with a semi-persistent slot format configuration, a DL symbol and a UL symbol may not be changed by the dynamic SFI, but a flexible symbol may be changed into a DL symbol or a UL symbol by the dynamic SFI, or not changed by the SFI.

In an implementation, the network may configure a table including multiple slot formats, for example, a table including 64 slot formats. Each slot format corresponds to an SFI index, and the corresponding slot format may be found in the table through the SFI index. A slot format describes a slot structure of a slot, specifically including information such as the number and time-domain positions of DL symbols in the slot, the number and time-domain positions of UL symbols in the slot, and the number and time-domain positions of flexible symbols in the slot.

FIG. 1 illustrates a first flowchart of a method for resource configuration according to some embodiments of the disclosure. As illustrated in FIG. 1, the method for resource configuration includes the following.

At 101, a terminal receives first control information from a network device. The first control information includes slot structure information of N slots, and N is a positive integer.

In some embodiments of the disclosure, the terminal may be any device capable of communicating with a network, e.g., a mobile phone, a tablet, a laptop, a game console, a hand-held computer and a desktop.

In some embodiments of the disclosure, the network device is a base station, for example, a gNB in a 5th-generation (5G) system and an Evolved Node B (eNB) in a 4th-generation (4G) system.

In some embodiments of the disclosure, the first control information includes the slot structure information of the N slots. In an implementation, the first control information is an SFI, and the SFI may indicate slot structures of the N slots in a first period. During particular implementation, the first control information (i.e., the SFI) is transmitted in a GC-PDCCH.

For example, the first period is a monitoring cycle for the SFI, or a monitoring cycle of a search space where the GC-PDCCH is located, or a cycle for a semi-persistent slot format configuration.

In some embodiments of the disclosure, the slot structure information includes information of SFI indexes. As illustrated FIG. 2, the first control information includes slot structure information of 4 slots. Here, 100110 represents the slot structure information of a slot. 100100 represents the slot structure information another slot. 001011 represents the slot structure information of a further slot. 010100 represents the slot structure information of yet another slot. Here, 100110, 100100, 001011 and 010100 are all information of the SFI indexes. The information of the SFI indexes may be retrieved from a table. The table indicates corresponding relationships between SFI indexes and slot formats. The table is predefined or configured by the network.

At 102, the terminal determines slot structures of the N slots according to the first control information.

In some embodiments of the disclosure, the terminal determines the slot structures of the N slots according to the information of SFI indexes. Here, different information of the SFI indexes corresponds to different slot structures, and a network may configure a table for storing corresponding relationships between various information of the SFI indexes and slot structures. Based on the table, the terminal may determine a corresponding slot structure according to the information of the SFI indexes.

In some embodiments of the disclosure, after obtaining the slot structures of the N slots, the terminal further needs to determine which N slots in the first period correspond to the slot structures of the obtained N slots. That is to say, time-domain positions of the N slots in the first period are determined. Specifically, the terminal may determine the time-domain positions of the N slots in the first period in the following approaches.

In a first approach: the first control information further includes first bitmap information, and the first bitmap information is used for determining the time-domain positions of the N slots in the first period.

In an embodiment, a bit size of the first bitmap information is equal to the number of slots in the first period, and a bit in the first bitmap information corresponds to a slot in the first period.

As illustrated in FIG. 3, the first control information includes not only slot structure information of 4 slots, but also first bitmap information. It is assumed that the first period includes 10 slots, and the first bitmap information represents the 10 slots in the first period by 10 bits, each bit corresponding to a slot. If the bit corresponding to a certain slot is 1, it indicates that the first control information (for example, the SFI) is used for indicating a slot structure of the slot. Different SFIs may indicate different slots via different first bitmap information. As illustrated in FIG. 4, the first bitmap information is 1001100010, indicating that the 4 slots are a slot 0, a slot 3, a slot 4 and a slot 8 respectively. Here, slot structure information of the slot 0 is 100110. Slot structure information of the slot 3 is 100100. Slot structure information of the slot 4 is 001011. Slot structure information of the slot 8 is 010100.

In a second approach: the terminal receives first configuration information from the network device. The first configuration information is used for determining the time-domain positions of the N slots in the first period.

In an implementation, the first configuration information includes second bitmap information, and the second bitmap information is used for determining the time-domain positions of the N slots in the first period.

As illustrated in FIG. 4, the first control information includes slot structure information of 4 slots, and the first configuration information includes second bitmap information. It is assumed that the first period includes 10 slots, and the second bitmap information represents the 10 slots in the first period by 10 bits, each bit corresponding to a slot. If the bit corresponding to a certain slot is 1, it indicates that the first control information (for example, the SFI) is used for indicating a slot structure of the slot. The network device changes the second bitmap information in the first configuration information such that the first control information may indicate slot structures of different slots in the first period. As illustrated in FIG. 4, the second bitmap information is 1001100010, indicating that the 4 slots are a slot 0, a slot 3, a slot 4 and a slot 8 respectively. The first control information includes slot formats of the 4 slots, corresponding to the slot 0, the slot 3, the slot 4 and the slot 8 respectively. Here, slot structure information of the slot 0 is 100110. Slot structure information of the slot 3 is 100100. Slot structure information of the slot 4 is 001011. Slot structure information of the slot 8 is 010100.

In some embodiments of the disclosure, the following operations may be performed to inform the terminal of how many slots are indicated by the SFI.

1) The terminal receives second configuration information from the network device. The second configuration information is used for determining a value of N.

2) Alternatively, the terminal receives, from the network device, a size of the first control information and a duration of a first period corresponding to the first control information. The terminal determines a value of N based on the size of the first control information, the duration of the first period corresponding to the first control information, and the number of bits in each piece of information of a slot structure index.

For 1), the network device explicitly indicates the value of N (i.e., the number of slots that the SFI is applicable to) to the terminal. For example, the network sends the second configuration information through Radio Resource Control (RRC) signaling or control signaling, with the second configuration information including the value of N.

For 2), the network device implicitly indicates the value of N (i.e., the number of slots that the SFI is applicable to) to the terminal. For example, the size of the SFI is B=34 bits. The first period indicated by the SFI is A=10 slots. The terminal knows that the number of bits in each piece of information of a slot structure (i.e., information of an SFI index) is K=6 bits. In such a case, the terminal may determine that the number of slots that the SFI is applicable to is N=(B−A)/K=4 slots.

FIG. 5 illustrates a second flowchart of a method for resource configuration according to some embodiments of the disclosure. As illustrated in FIG. 5, the method for resource configuration includes the following.

At 501, a network device sends first control information to a terminal to enable the terminal to determine slot structures of N slots according to the first control information. The first control information includes slot structure information of the N slots, and N is a positive integer.

In some embodiments of the disclosure, the terminal may be any device capable of communicating with a network, e.g., a mobile phone, a tablet, a laptop, a game console, a hand-held computer and a desktop.

In some embodiments of the disclosure, the network device is a base station, for example, a gNB in a 5G system and an eNB in a 4G system.

In some embodiments of the disclosure, the first control information includes the slot structure information of the N slots. In an implementation, the first control information is an SFI, and the SFI may indicate slot structures of the N slots in a first period. During particular implementation, the first control information (i.e., the SFI) is transmitted in a GC-PDCCH.

In some embodiments of the disclosure, the slot structure information includes information of SFI indexes. As illustrated in FIG. 2, the first control information includes slot structure information of 4 slots. Here, 100110 represents the slot structure information of a slot. 100100 represents the slot structure information another slot. 001011 represents the slot structure information of a further slot. 010100 represents the slot structure information of yet another slot. Here, 100110, 100100, 001011 and 010100 are all information of the SFI indexes.

The operation that the terminal determines the slot structures of the N slots according to the first control information includes the operation that the terminal determines the slot structures of the N slots according to the information of the SFI indexes In some embodiments of the disclosure, after obtaining the slot structures of the N slots, the terminal further needs to determine which N slots in the first period correspond to the slot structures of the obtained N slots. That is to say, time-domain positions of the N slots in the first period are determined. The time-domain positions of the N slots in the first period may be determined in the following approaches.

In a first approach: the first control information further includes first bitmap information. The first bitmap information is used for determining the time-domain positions of the N slots in the first period.

In a second approach: the network device sends first configuration information to the terminal. The first configuration information is used for determining the time-domain positions of the N slots in the first period.

In an implementation, the first configuration information includes second bitmap information, and the second bitmap information is used for determining the time-domain positions of the N slots in the first period.

In some embodiments of the disclosure, the following operations may be performed to inform the terminal of how many slots are indicated by the SFI.

1) The network device sends second configuration information to the terminal. The second configuration information is used for determining a value of N.

2) Alternatively, the network device sends, to the terminal, a size of the first control information and a duration of a first period corresponding to the first control information. The terminal determines a value of N based on the size of the first control information and the duration of the first period corresponding to the first control information.

For 1), the network device explicitly indicates the value of N (i.e., the number of slots that the SFI is applicable to) to the terminal.

For 2), the network device implicitly indicates the value of N (i.e., the number of slots that the SFI is applicable to) to the terminal. For example, the size of the SFI is B=34 bits. The first period indicated by the SFI is A=10 slots. The terminal knows that the number of bits in each piece of slot structure information (i.e., information of an SFI index) is K=6 bits. In such a case, the terminal may determine that the number of the slots that the SFI is applicable to is N=(B−A)/K=4 slots.

FIG. 6 illustrates a first schematic diagram of structural composition a device for resource configuration according to some embodiments of the disclosure. As illustrated in FIG. 6, the device for resource configuration includes a first receiving unit 601 and a determination unit 602.

The first receiving unit is configured to receive first control information from a network device. The first control information includes slot structure information of N slots, and N is a positive integer.

The determination unit is configured to determine slot structures of the N slots according to the first control information.

In an implementation, the first control information further includes first bitmap information. The first bitmap information is used for determining time-domain positions of the N slots in a first period.

In an implementation, the device further includes a second receiving unit 603.

The second receiving unit is configured to receive first configuration information from the network device. The first configuration information is used for determining time-domain positions of the N slots in a first period.

In an implementation, the first configuration information includes second bitmap information, and the second bitmap information is used for determining the time-domain positions of the N slots in the first period.

In an implementation, the slot structure information includes information of SFI indexes.

The determination unit 602 is configured to determine the slot structures of the N slots according to the information of the SFI indexes.

In an implementation, the device further includes a third receiving unit 604.

The third receiving unit is configured to receive second configuration information from the network device. The second configuration information is used for determining a value of N.

In an implementation, the device further includes a fourth receiving unit 605 and the determination unit 602.

The fourth receiving unit is configured to receive, from the network device, a size of the first control information and a duration of a first period corresponding to the first control information.

The determination unit is further configured to determine a value of N based on the size of the first control information and the duration of the first period corresponding to the first control information.

Those skilled in the art should know that the function realized by each unit in the device for resource configuration illustrated in FIG. 6 may be understood with reference to related descriptions about the above methods for resource configuration. The function of each unit in the device for resource configuration illustrated in FIG. 6 may be realized by a program running on a processor, and may also be realized by a specific logical circuit.

Figure 7:
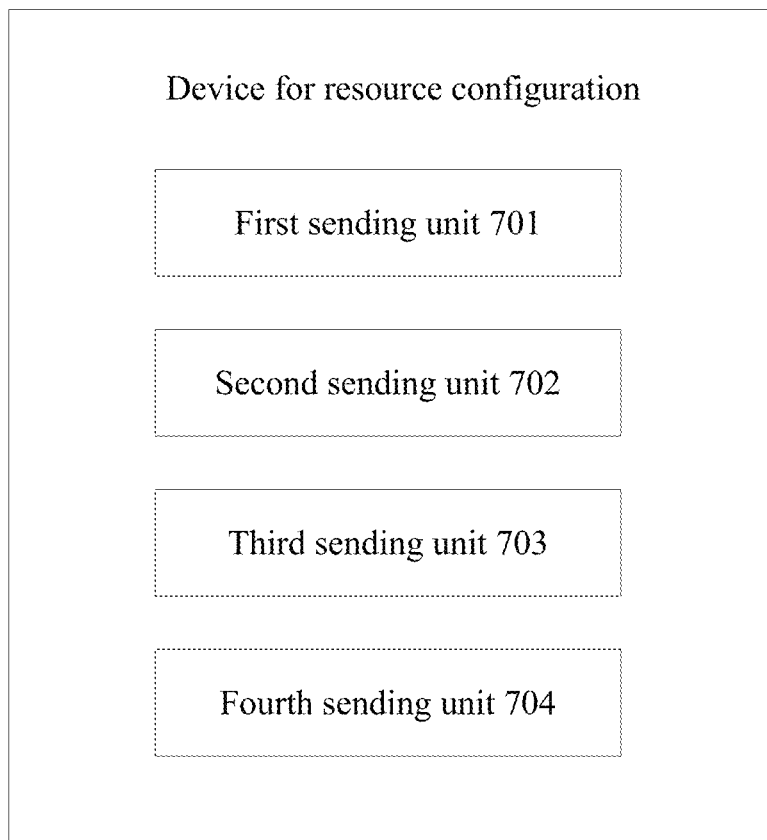
FIG. 7 illustrates a second schematic diagram of structural composition of a device for resource configuration according to some embodiments of the disclosure.

FIG. 7 illustrates a second schematic diagram of structural composition a device for resource configuration according to some embodiments of the disclosure. As illustrated in FIG. 7, the device for resource configuration includes a first sending unit 701.

The first sending unit is configured to send first control information to a terminal to enable the terminal to determine slot structures of N slots according to the first control information. The first control information includes slot structure information of the N slots, N being a positive integer.

In an implementation, the first control information further includes first bitmap information, and the first bitmap information is used for determining time-domain positions of the N slots in a first period.

In an implementation, the device further includes a second sending unit 702.

The second sending unit is configured to send first configuration information to the terminal. The first configuration information is used for determining time-domain positions of the N slots in a first period.

In an implementation, the first configuration information includes second bitmap information, and the second bitmap information is used for determining time-domain positions of the N slots in a first period.

In an implementation, the slot structure information includes the information of the SFI indexes. The operation that the terminal determines the slot structures of the N slots according to the first control information includes the operation that the terminal determines the slot structures of the N slots according to the information of the SFI indexes.

In an implementation, the device further includes a third sending unit 703.

The third sending unit is configured to send second configuration information to the terminal. The second configuration information is used for determining a value of N.

In an implementation, the device further includes a fourth sending unit 704.

The fourth sending unit is configured to send, to the terminal, a size of the first control information and a duration of a first period corresponding to the first control information, to enable the terminal to determine a value of N based on the size of the first control information and the duration of the first period corresponding to the first control information.

Those skilled in the art should appreciate that the function realized by each unit in the device for resource configuration illustrated in FIG. 7 may be understood with reference to related descriptions about the method for resource configuration. The function of each unit in the device for resource configuration illustrated in FIG. 7 may be realized by a program running on a processor, and may also be realized by a specific logical circuit.

If implemented in the form of a software functional module instead of being marketed or used as an independent product, the device for resource configuration according to the embodiments of the disclosure may also be stored in a computer-readable storage medium. Based on such understanding, the technical solutions of this embodiment in substance, or in the part contributing to the related art, or all or some of the technical solutions may be embodied in the form of a software product. The computer software product is stored in a storage medium and includes instructions for enabling a computer device (which may be a personal computer, a server, a network device or the like) to perform all or some of actions of the methods described in various embodiments. The aforementioned storage medium includes various mediums capable of storing program codes, such as a USB flash disk, a mobile hard disk drive, a read-only memory (ROM), a random access memory (RAM), a magnetic disk and an optical disk. As such, the embodiments of the disclosure are not limited to any specific hardware and software combination.

Correspondingly, also provided in the embodiments of the disclosure is a computer storage medium stored with computer-executable instructions which, when executed by a processor, implement the methods for resource configuration according to the embodiments of the disclosure.

Figure 8:
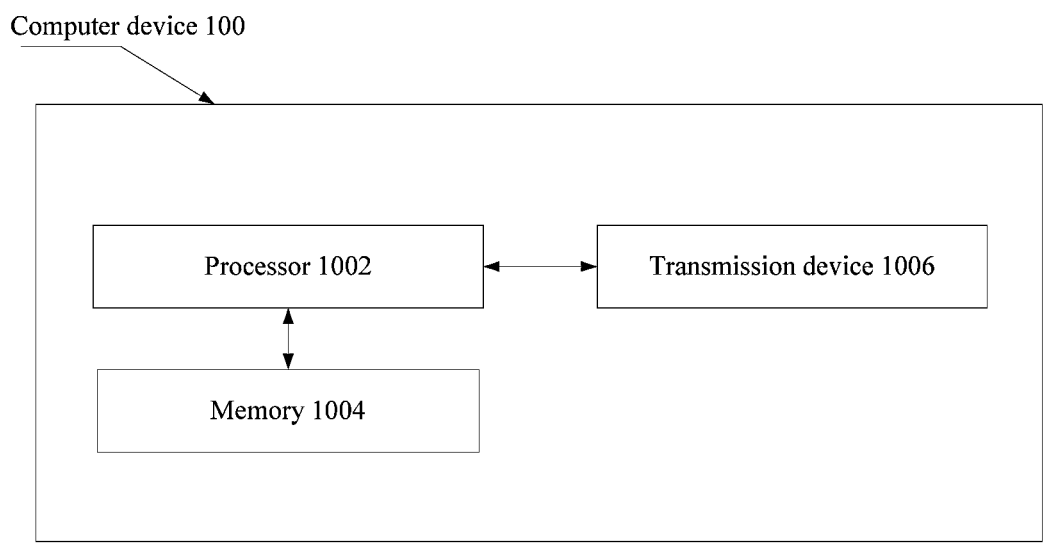
FIG. 8 illustrates a schematic diagram of structural composition of a computer device according to some embodiments of the disclosure.

FIG. 8 illustrates a schematic diagram of structural composition of a computer device according to some embodiments of the disclosure. The computer device may be a terminal or a network device. As illustrated in FIG. 8, the computer device 100 may include one or more (only one is illustrated in the figure) processors 1002 (the processor 1002 may include, but not limited to, a processing device such as a Micro Control Unit (MCU) or a Field Programmable Gate Array (FPGA)), a memory 1004 configured to store data and a transmission device 1006 configured for a communication function. It could be understood by those of ordinary skill in the art that the structure illustrated in FIG. 8 is only exemplary and not intended to limit the structure of the electronic device. For example, the computer device 100 may include more or fewer components than the components illustrated in FIG. 8 or have a configuration different from that illustrated in FIG. 8.

The memory 1004 may be configured to store a software program and a module of application software, for example, a program instruction/module corresponding to the methods in the embodiments of the disclosure. The processor 1002 implements the abovementioned method by running the software program and module stored in the memory 1004 to execute various functional applications and data processing. The memory 1004 may include a high-speed random access memory and may also include a non-volatile memory, for example, one or more magnetic storage devices, flash memories or other non-volatile solid-state memories. In some examples, the memory 1004 may further include a memory arranged remotely relative to the processor 1002 and the remote memory may be connected with the computer device 100 through a network. An example of the network includes, but not limited to, the Internet, an enterprise intranet, a local area network, a mobile communication network and a combination thereof.

The transmission device 1006 is configured to receive or send data through a network. A specific example of the network may include a wireless network provided by a communication provider of the computer device 100. In an example, the transmission device 1006 includes a Network Interface Controller (NIC), which may be connected with another network device through a base station so as to be able to communicate with the Internet. In an example, the transmission device 1006 may be a Radio Frequency (RF) module configured to communicate with the Internet wirelessly.

In the technical solutions of the embodiments of the disclosure, the terminal receives the first control information from the network device, wherein the first control information includes the slot structure information of the N slots, and N is a positive integer; and the terminal determines the slot structures of the N slots according to the first control information. By means of the technical solutions of the embodiments of the disclosure, instead of indicating slot formats of all slots in a monitoring cycle, a dynamic SFI may indicate the slot formats of only some slots (for example, N slots) in the monitoring cycle. Meanwhile, bitmap information is used to indicate the slot structures of which slots are indicated by the SFI in the monitoring cycle. By such an SFI, the number of bits in information is greatly reduced, and influence brought by excessive information bits of an SFI to channel detection performance of a GC-PDCCH is avoided.

The technical solutions specified in the embodiments of the disclosure may be freely combined without conflicts.

In some embodiments provided in the disclosure, it is to be understood that the disclosed methods and devices may be implemented in other ways. The device embodiments described above are merely exemplary. For example, division of units is only logical functional division, and other division manners may be adopted during practical implementation. For example, multiple units or components may be combined or integrated into another system, or some features may be neglected or not executed. In addition, coupling or direct coupling or communicative connection between various displayed or discussed components may be indirect coupling or communicative connection, implemented through some interfaces, device or units, and may be electrical and mechanical or in other forms.

The units above described as separate parts may or may not be physically separated. Parts displayed as units may or may not be physical units, and may be located in the same place or may also be distributed to multiple network units. Some or all of the units may be selected according to a practical requirement to achieve the purposes of the solution of an embodiment.

In addition, functional units in various embodiments of the disclosure may be integrated into a second processing unit. Each unit may also serve as an independent unit and two or more than two units may also be integrated into a unit. The integrated unit may be implemented in a hardware form and may also be implemented in form of hardware and software combined functional unit.

The above are merely detailed description of the disclosure, but the scope of protection of the disclosure is not limited thereto. Any variations or replacements that would be readily conceivable by those skilled in the art within the technical scope disclosed by the disclosure shall fall within the scope of protection of the disclosure.

The invention claimed is:

1. A method for resource configuration, comprising:
   sending, by a network device, first control information comprising slot structure information of N slots to a terminal, to enable the terminal to determine slot format indication (SFI) index information corresponding to the N slots respectively according to the slot structure information and to determine slot structures of the N slots according to the SFI index information corresponding to the N slots respectively, wherein N is a positive integer; and
   sending, by the network device, first configuration information to the terminal, wherein the first configuration information is used for determining time-domain positions of the N slots in a first period, and wherein the first period is a monitoring period of the first control information, or the first period is a monitoring period of a search space where the first control information is located.

2. The method of claim 1, wherein the first control information comprises first bitmap information, and the first bitmap information is used for determining time-domain positions of the N slots in the first period.

3. The method of claim 1, further comprising:
   sending, by the network device, second configuration information to the terminal, wherein the second configuration information is used for determining a value of N.

4. The method of claim 1, further comprising:
   configuring, by the network device, a table which indicates relationship between SFI indices and the slot structures.

5. The method of claim 1, further comprising:
   sending, by the network device to the terminal, a size of the first control information and a duration of the first period corresponding to the first control information, to enable the terminal to determine a value of N based on the size of the first control information and the duration of the first period corresponding to the first control information.

6. A network device, comprising: a transmission device and a processor, wherein the transmission device is configured to:
   send first control information comprising slot structure information of N slots to a terminal, to enable the terminal to determine slot format indication (SFI) index information corresponding to the N slots respectively according to the slot structure information and to determine slot structures of the N slots according to the SFI index information corresponding to the N slots respectively, wherein N is a positive integer; and
   send first configuration information to the terminal, wherein the first configuration information is used for determining time-domain positions of the N slots in a first period, and wherein the first period is a monitoring period of the first control information, or the first period is a monitoring period of a search space where the first control information is located.

7. The network device of claim 6, wherein the first control information comprises first bitmap information, and the first bitmap information is used for determining time-domain positions of the N slots in the first period.

8. The network device of claim 6, wherein the transmission device is further configured to:
   send second configuration information to the terminal, wherein the second configuration information is used for determining a value of N.

9. The network device of claim 6, the processor is configured to:
   configure a table which indicates relationship between SFI indices and the slot structures.

10. The network device of claim 6, wherein the transmission device is further configured to:
   send, to the terminal, a size of the first control information and a duration of the first period corresponding to the first control information, to enable the terminal to determine a value of N based on the size of the first control information and the duration of the first period corresponding to the first control information.

* * * * *